Figure 1:
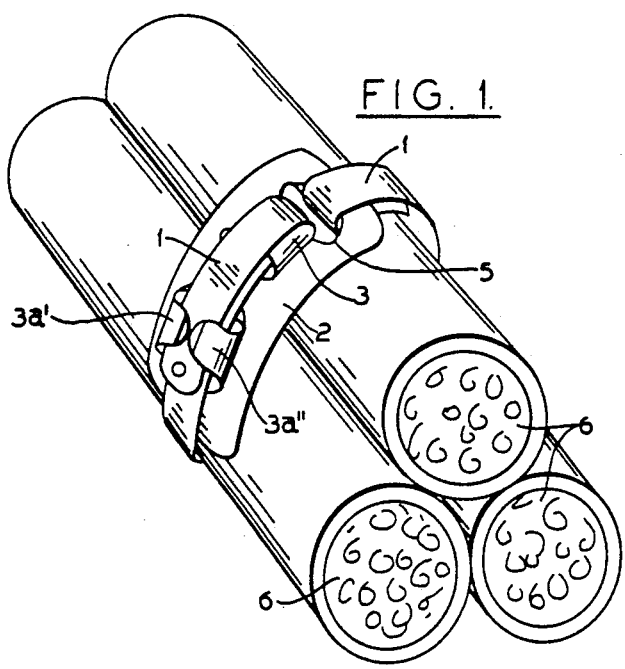

United States Patent [19]

Pritchard et al.

[11] Patent Number: 5,007,138

[45] Date of Patent: Apr. 16, 1991

[54] DEVICE FOR STRAPPING CABLES, PIPES OR OTHER SIMILAR ITEMS, TOGETHER OR TO SUPPORTS

[76] Inventors: David A. Pritchard, 3 Harvest Road, Englefield Green, Egham, Surrey; Michael J. Donnelly, 137 Slough Road, Datchet, Berkshire, both of England

[21] Appl. No.: 899,947

[22] Filed: Aug. 25, 1986

Related U.S. Application Data

[63] Continuation of Ser. No. 661,409, Oct. 16, 1984, abandoned.

[51] Int. Cl.$^5$ .............................................. B65D 63/06
[52] U.S. Cl. ...................................... 24/23 B; 24/200
[58] Field of Search ................... 24/23 B, 23 R, 17 A, 24/17 B, 19, 20 R, 21, 22, 20 EE, 198, 200, 169

[56] References Cited

U.S. PATENT DOCUMENTS

| | | | |
|---|---|---|---|
| Re. 8,679 | 4/1879 | Sheppard | 24/23 B |
| 69,849 | 10/1867 | Sheppard | 24/23 B |
| 180,388 | 7/1876 | Snyder | 24/23 B |
| 211,525 | 2/1879 | Pittman | 24/23 B |
| 653,337 | 7/1900 | Campbell | 24/21 |
| 834,758 | 10/1906 | Ross | 24/23 B |
| 1,855,007 | 4/1932 | Bradley | 24/23 B |
| 2,011,634 | 8/1935 | Hirsh | 24/200 |
| 2,192,979 | 3/1940 | McAneny | 24/23 B |
| 2,286,159 | 2/1952 | Grishman | 24/200 |
| 2,293,562 | 8/1942 | Rosenthal | 24/200 |
| 2,407,466 | 9/1946 | Alberts | 24/200 |
| 2,473,209 | 6/1949 | Lombardi | 24/200 X |
| 2,914,827 | 12/1959 | Crammond | 24/23 B |

Primary Examiner—Laurie K. Cranmer
Attorney, Agent, or Firm—Bell, Seltzer, Park & Gibson

[57] ABSTRACT

A device for strapping cables, pipes and similar items together or to a support comprises a strap (1) constituted by a strip of bendable material, preferably metal, attached at one end to a buckle plate (2), conveniently of sheet metal, by passing one end of the strap (1) through a slot (5) and bending it back to underlie a portion of the strap which is wrapped around the cables (6) or the like to be strapped. The buckle plate has a raised bridge portion (3) and an aligned pair of fixed ears (3a',3a'') with a gap therebetween. The other end of the strap (1) is threaded beneath the ears and passed beneath the bridge portion (3). After pulling the stripping tight, its free end is bent back over the bridge portion (3) and secured by tilting it slightly about its axis and sliding it through the gap between the ears 3a' and 3a''. In other embodiments the strip (1) is integral with the buckle plate (2).

9 Claims, 1 Drawing Sheet

U.S. Patent   Apr. 16, 1991   Sheet 1 of 1   5,007,138

DEVICE FOR STRAPPING CABLES, PIPES OR OTHER SIMILAR ITEMS, TOGETHER OR TO SUPPORTS

This is a continuation of application Ser. No. 661,409, filed Oct. 16, 1984, and now abandoned.

This invention relates to a device for strapping cables, pipes or other similar items, together or to a support, and which is intended to be assembled around the cables or the like without the use of tools, it being sufficient to assemble the device by pulling the strapping hand tight, and thus avoiding the possibility of over-tensioning the strap.

The present invention consists in a strapping device comprising a strap constituted by a strip of bendable material, preferably metal, attached at one end to a buckle plate, conveniently made of sheet metal, which is adapted to secure the other end of the strip after the strip has been wrapped tight around the members to be strapped, wherein the buckle plate has a bridge portion which is wider than the width of the strip, the buckle plate also including means for holding the other end of the strip after it has been passed under the bridge portion and has been bent to overlap the top of the bridge portion, characterised in that the holding means comprises two fixed ears raised above the plate to form a passage therebeneath substantially in alignment with the bent back end portion of the strip, said two fixed ears having a gap therebetween sufficient to permit the thickness of the strip to pass therethrough, the distance between the connections of the fixed ears to the buckle plate being at least approximately twice the width of the strip.

Figure 3:
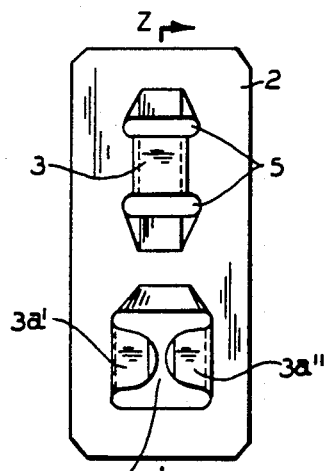
Figure 4:
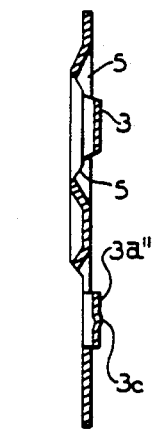
Figure 2:
Figure 5:
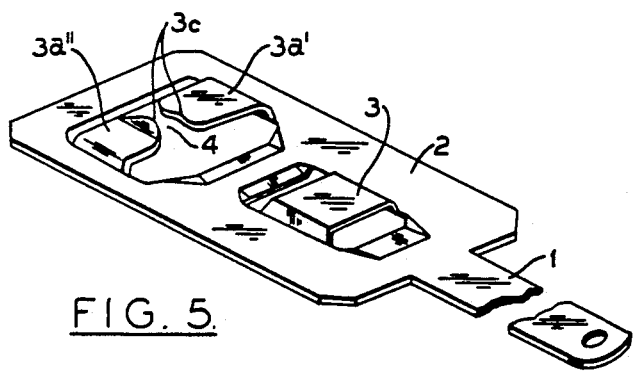
Figure 6:
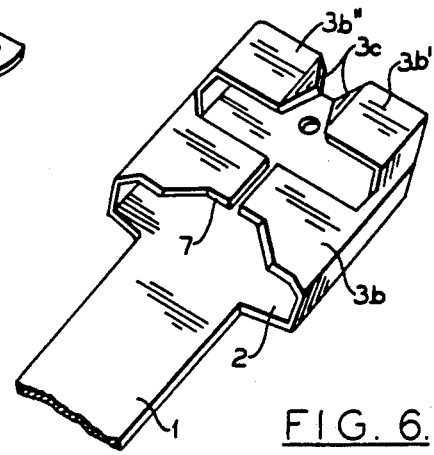
Figure 7:
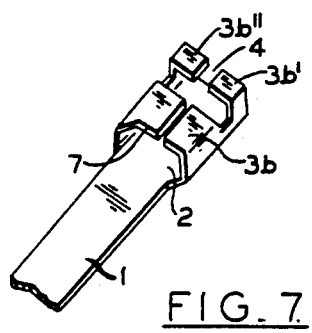

In order that the invention may be more clearly understood, reference will now be made to the accompanying drawing, in which:

FIG. 1 is a perspective view of one embodiment of the device, according to the invention, shown assembled around and tying together three electric cables, FIG. 2 shows the strap of FIG. 1, FIG. 3 is a plan view of the buckle plate shown in FIG. 1, FIG. 4 is a section through FIG. 3 taken along the line Z—Z, FIG. 5 is a perspective view of an alternative embodiment, FIGS. 6 and 7 are perspective views of further embodiments.

Referring to FIGS. 1 to 4, the device comprises a strap 1 of bendable strip metal, conveniently 0.5 mms thick type 316 stainless steel, and a buckle plate 2, conveniently made of the same material 0.889 mms thick, and stamped to form a raised bridge portion 3 providing a passage beneath the bridge which is wider than the width d of the strip steel forming the strap, the underside of the flat top of the bridge preferably being spaced from the surface of the plate by slightly less than the thickness of the strip.

Slots 5 are formed in the plate at opposite ends of the bridge portion 3. The edges of the slots remote from the bridge portion may be formed downwards as shown to facilitate pushing the strip through the bridge.

The buckle plate is also formed with a second raised bridge portion which is divided approximately along its centre line to form two fixed ears $3a'$ and $3a''$ and is made wider than the bridge 3.

To assemble the device around, for example a group of electric cables 6 to tie them together, one end of the strip 1 is passed through the slot 5 nearest an end of the plate, from the raised bridge side of the buckle plate, for a distance of about 2.5 cms, and is folded back on the strip. The strip attached to the buckle plate is then wrapped around the cables 6 with the bridge portion 3 facing away from the cables, and the free end of the strip 1 is threaded under the ears $3a'$ and $3a''$ and through the passage under the bridge 3. Holding the buckle plate 2 firmly to prevent the assembly turning around the cables, the free end of the strip is pulled until the strip is tight, and at the same time the projecting end of the strip is bent back over the bridge 3 and the ears. The free end of the strip is then first tilted slightly about its axis and is slid through the gap 4 between the fixed ears $3a'$ and $3a''$ with its edge inserted beneath one of the ears. It is then pushed sideways until its other edge is clear of the end of the second ear, whereupon the strip is pushed sideways in the opposite direction until its said other edge is engaged below said second ear and the strip is centralised beneath the fixed ears. The strip and buckle are now secured. The fixing and securing of the strapping is thus a simple operation to perform, even under difficult conditions. No bending of the ears is necessary, and consequently damage to the surface finish on the buckle and strip is minimised. To facilitate inserting the free end of the strip beneath the ears, the overall width 2d between their connections to the buckle 2 should be approximately twice the width d of the strip. For example, for a ¼ inch (63 mm) wide strip of 26SWG (0.46 mm) stainless steel, the internal width of the bridge 3 can be 112 mm and of the bridge $3a$ 143 mm. The free ends $3c$ of the ears may be bent slightly away from the buckle to form lead-in portions facilitating sideways insertion of the strip beneath the ears.

Various modifications may be made without departing from the scope of the invention. For example, instead of stainless steel the components may be made of mild steel or other suitable material. Further the strap may be attached to the buckle plate by welding, or by stamping it integrally with the buckle plate as shown in FIG. 5, in which the buckle plate 2 of the construction shown in FIG. 4 is made in one piece with the strip 1.

Instead of stamping up the fixed ears $3a'$ and $3a''$ from the centre of the buckle plate, they may be constituted by ears projecting from the edge of the buckle plate and folded back inwards to their fixed positions with a gap 4 therebetween.

FIGS. 6 and 7 which show modified constructions are particularly suitable for smaller and lighter strapping. In each of these embodiments the buckle portion 2 is integral with the strip 1, and both the bridge $3b$ and the ears $3b'$ and $3b''$ are formed by folding up ear portions from opposite sides of the buckle portion. The ear portions forming the bridge $3b$ may be shaped to form a recess 7 for centralising the strip when it is folded back over the bridge $3b$.

The buckle portions of the embodiments of FIGS. 6 and 7 can also be made as separate buckle plates to which the end of the strap 1 can be attached. It is not essential for the bridge 3 or $3b$ to be raised above the main body or base of the buckle or buckle portion; it may lie substantially flush with the remainder of the plate forming the buckle.

We claim:

1. A strapping device for joining cables, pipes or similar items together or to a support, and which may be assembled around such items easily and without the use of tools, said strapping device comprising an elongate strip of bendable material having one end and an opposite end and so as to define an opposite end portion adjacent said opposite end, and substantially parallel longitudinal side edges, a buckle plate attached to said one end of said strip, said buckle plate having an outer surface, and means mounted on said plate for receiving and holding said opposite end portion of said strip after the strip has been wrapped around the items to be joined, said strip receiving and holding means comprising (a) a bridge portion extending transversely of said buckle plate at a location longitudinally spaced from said one end of said strip and defining a first longitudinal passageway, with said first passageway having a transverse width greater than the width of said strip and being sized so as to be adapted to receive a portion of the strip therethrough, and (b) a pair of transversely spaced apart ears extending outwardly from said outer surface of said plate at a location longitudinally spaced from said bridge portion and on the side of said bridge portion opposite said one end of said strip, said ears each having an outwardly extending base portion and a transversely extending outer end portion, with said base portions of said ears being transversely spaced apart a distance greater than the width of said strip so as to be adapted to receive a portion of the strip therebetween, and with said outer end portions extending generally parallel to said outer surface of said plate and so as to define a transverse gap between said outer end portions, and such that said ears collectively define a second longitudinal passageway which is in longitudinal alignment with said first passageway, and with said ears being configured and dimensioned so as to permit said opposite end portion of said strip to be longitudinally inserted through said second passageway and then through said first passageway, then bent over said bridge portion so as to provide a superposed end portion which is positioned over the portion of the strip passing through said second passageway, and then passing the superposed end portion of the strip through said gap and into said second passageway by tilting said superposed end portion and transversely inserting one of said side edges thereof sideways through said gap and beneath one of said ears until the other of said side edges thereof has passed through said gap and into said second passageway, and then pushing said superposed end portion transversely in the opposite direction until the other of said side edges is positioned under the other of said ears, and so that the superposed end portion is secured within said second passageway.

2. A strapping device as set forth in claim 1 in which said second passageway defined by said ears has a width at least approximately twice the width of said strip.

3. A strapping device as set forth in claim 1 in which said bridge portion extends outwardly from said outer surface of said buckle plate.

4. A strapping device as set forth in claim 1 in which said buckle plate includes a transverse slot therein and said one end of said strip is attached to said buckle plate by a loop in said one end which passes through said slot.

5. A strapping device as set forth in claim 1 in which said strip and said buckle plate are composed of an integral piece of metallic material.

6. A strapping device as set forth in claim 1 in which said buckle plate comprises sheet metal and said bridge portion and said spaced-apart ears comprise stamped portions raised from the surface of said buckle plate.

7. A strapping device as set forth in claim 1 in which said buckle plate is stamped out of sheet metal and said bridge portion and said ears are folded back over said outer surface of said buckle plate.

8. A strapping device as set forth in claim 1 wherein said outer end portions of said ears include outer edge portions which are oppositely inclined away from said outer surface of said buckle plate to facilitate assembly of the superposed end portion of said strip through said gap.

9. A strapping device as set forth in claim 1 wherein said ears are transversely aligned.

* * * * *